May 14, 1963 R. SCHICK 3,089,571
ELECTRIC SHIFTING ARRANGEMENT FOR CHANGE-SPEED GEARS
Filed Feb. 18, 1960
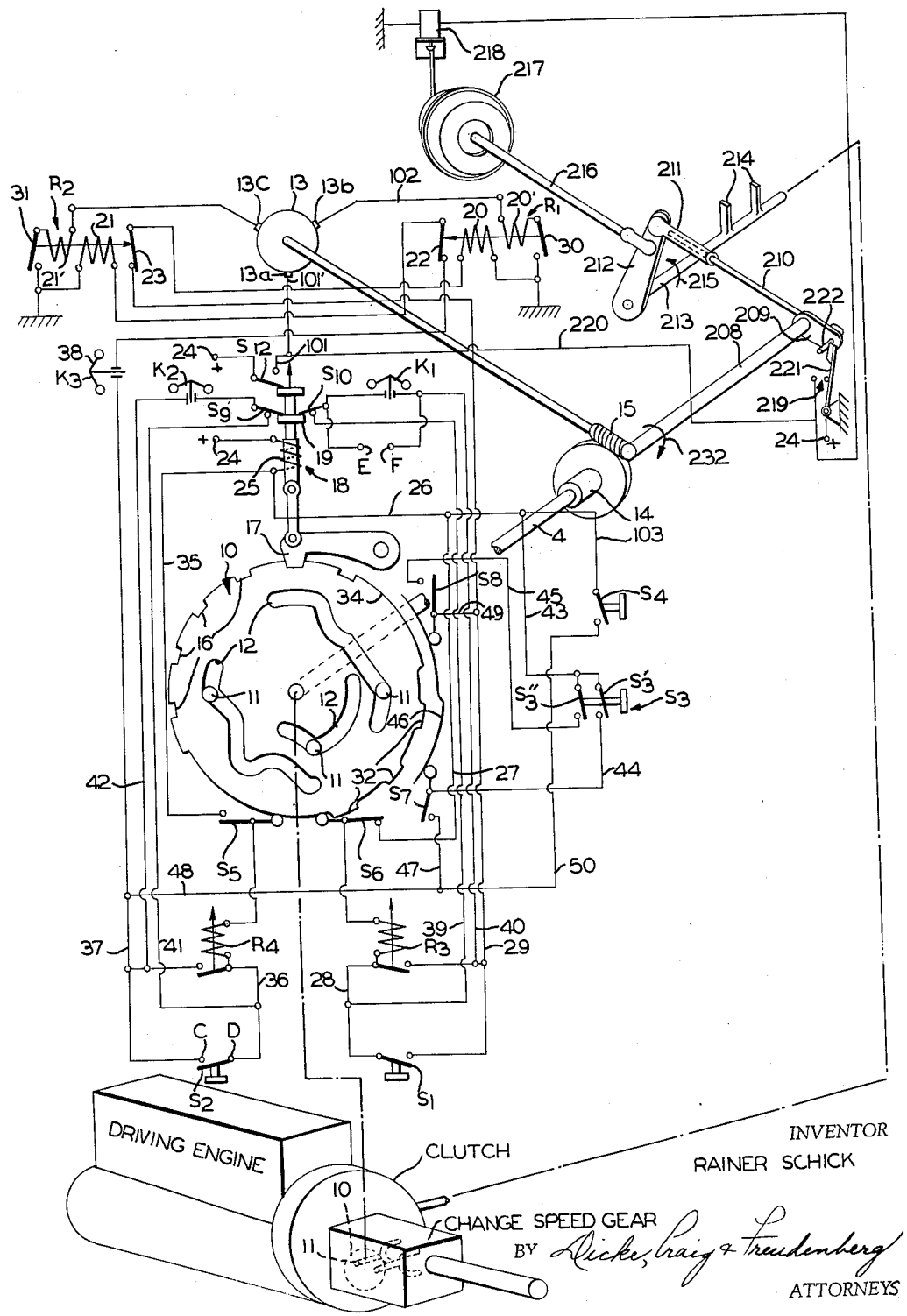
INVENTOR
RAINER SCHICK
BY Dicke, Craig & Freudenberg
ATTORNEYS

United States Patent Office 3,089,571
Patented May 14, 1963

3,089,571
ELECTRIC SHIFTING ARRANGEMENT FOR CHANGE-SPEED GEARS
Rainer Schick, Esslingen (Neckar)-St. Bernhardt, Germany, assignor to Daimler-Benz Aktiengesellschaft, Stuttgart-Unterturkheim, Germany
Filed Feb. 18, 1960, Ser. No. 9,498
Claims priority, application Germany Feb. 18, 1959
24 Claims. (Cl. 192—3.5)

The present invention relates to an electric shifting arrangement for change-speed transmissions, especially for motor vehicles, in which the shifting members, for example, the shifting forks of the change-speed transmission are guided within the change-speed transmission in a rotatable guide disk member which is adapted to be selectively driven in either direction of rotation thereof by means of an electric motor over a high speed-reduction gear and a slip-clutch and which is provided along the periphery thereof with a plurality of notches or recesses corresponding to the various shifting positions into which a latch member engages which in turn is controllably actuated by means of the armature of an electromagnetic relay controlled by means of shifting pulses.

More particularly, the present invention relates to a further improvement of an electric shifting arrangement for change-speed transmissions, especially for motor vehicles, of the type described in the co-pending application Ser. No. 816,177, filed in the U.S. Patent Office on May 27, 1959, now Patent No. 2,956,444 issued October 18, 1960 in the name of Wolf-Dieter Bensinger et al., entitled "Electric Shifting Arrangement for Change-Speed Transmissions," and assigned to the assignee of the present application, the subject matter of the said co-pending application being incorporated herein by reference, insofar as necessary.

The present invention essentially consists in operatively and mechanically connecting the electric motor driving and mechanically connecting the guide disk member with the vehicle clutch for purposes of disengaging the same in such a manner that after producing a shifting impulse the vehicle clutch is disengaged and is retained in the disengaged position thereof until the next speed is fully engaged within the change-speed transmission. By the use of such an arrangement, the electric motor present for actuating the shifting arrangement is utilized more fully and in a more favorable manner, and separate servo-motors or the like which normally actuate the vehicle clutch as well as the control devices associated with the servo-motors for the control thereof and operatively connected with the shifting arrangement become superfluous and unnecessary.

Advantageously, the slip-clutch may be arranged between the drive means and the guide disk member, and the drive means may also drive by means of a shaft, an eccentric member, lever or crank in by-passing relationship with respect to the slip-clutch which eccentric member or lever, during a portion of its movement, pushes by means of a push-rod the clutch disengaging lever into a position thereof, in which the vehicle clutch is disengaged, and which during the subsequent portion of its movement withdraws the push-rod into the initial position thereof.

The vehicle clutch may be retained during actuation of the guide disk member by any suitable mechanism, for example, by a vacuum-operated piston retained in the corresponding position thereof by vacuum while the re-engaging movement of the clutch may be controlled by such mechanism in dependence on the position of the eccentric member or lever or the like, for example, by means of closing electric contacts and resulting opening of a valve to discontinue the presence of the vacuum in the cylinder housing such piston.

Accordingly, it is an object of the present invention to provide a shifting arrangement for change-speed transmissions in which the shifting of the change-speed transmission is controlled electrically while at the same time the clutch of the vehicle is automatically disengaged and re-engaged during the shifting operation.

Still another object of the present invention resides in the provision of a reliable, compact and relatively simple electric shifting arrangement for semi-automatically or automatically shifting the change-speed transmission while at the same time automatically controlling actuation of the main vehicle clutch.

Still another object of the present invention resides in the provision of an electric shifting arrangement for a change-speed transmission and clutch of a motor vehicle in which the same actuating and control elements utilized to shift the change-speed transmission are also operative to automatically engage and disengage the main clutch of the vehicle.

A further object of the present invention is the provision of a functionally reliable shifting arrangement for a change-speed transmission which, by simple means and utilizing relatively few additional parts is also adapted to actuate automatically the clutch of the vehicle in dependence on the shifting operation of the change-speed gear.

A further object of the present invention resides in the provision of an automatically actuated clutch in motor vehicles having an electrically shifted change-speed gear in which the need for servo-motors and control devices for the servo-motors to control disengagement and re-engagement of the clutch are obviated.

These and other objects, features and advantages of the present invention will become more obvious from the following description when taken in connection with the accompanying drawing which shows, for purposes of illustration only, in the single FIGURE thereof a schematic diagram of a shifting arrangement for a change-speed transmission and related clutch actuating mechanism in accordance with the present invention.

Referring now to the drawing which shows in the single figure thereof a schematic diagram of the shifting arrangement for the change-speed gear of a motor vehicle as well as the automatic clutch actuating mechanism controlled by the gear shifting mechanism in accordance with the present invention, it is noted that similar reference numerals are used in this figure in connection with the schematic gear shifting arrangement as are used for corresponding elements in the said aforementioned co-pending application, the subject matter of which is incorporated herein by reference. Those elements forming part of the clutch actuating mechanism in accordance with the present invention which are operatively connected with the gear shifting arrangement are designated in the single figure of the drawing by reference numerals of the 200 series.

The various speeds of the change-speed transmission, indicated only schematically, are shifted by means of a guide disk member generally designated by reference numeral 10 which is provided with special guide means 12, for example, in the form of slots or the like for the shifting forks 11 serving as shifting members of the transmission. The guide disk 10 is adapted to be rotated in both directions of rotation thereof, the clockwise direction of rotation thereof corresponding, for example, to an upward shifting operation and the counterclockwise direction of rotation to the downward shifting operation. The guide disk 10 is driven from an electric motor 13 which is operatively connected with the guide disk 10 over a speed reduction gear providing a large speed reduction, for example, over a worm gear drive 15, a slip-clutch 14 of any known conventional construction and adapted to provide a certain slippage under predetermined conditions and over shaft 4. The slip-clutch 14 is thereby used so as to drive at first only the clutch disengaging mechanism while the disk member 10 remains stationary as will appear more fully hereinafter, and also possibly to permit the motor 13 to continue to rotate or run out for a relatively short period of time, for example, even after de-energization of the motor 13, necessitated by reason of the inertia of the motor 13 making it impossible to stop the same instantaneously without transmitting thereby any shocks to the worm gear drive 15 and therewith to the guide disk member 10. The construction thereof in practice may also be made in such a manner that the guide disk 10 itself forms the worm gear wheel and slip-clutch and accommodates all of the other control cams or the like, as will be described more fully hereinafter. An arrangement of the individual devices in segment shape or also of step-shaped construction of the guide disk may also be used, if so desired.

Detents or notches 16 are provided along the periphery of the guide disk member 10 of which the number corresponds to the number of the shifting positions, i.e., for instance in the illustrated four-speed change-speed transmission, a total of six notches 16. A latch member 17 is adapted to engage into the notches 16 under the influence of a spring or by gravitational force which is adapted to be lifted out of the notches 16 by a lifting magnet generally designated by reference numeral 18. A switching device 19 is connected with the armature of the lifting magnet 18 to which three switches $S_9$, $S_{10}$ and $S_{12}$ are coordinated. The switch $S_{12}$ is thereby arranged in the energizing circuit 101, 101' of the motor 13 leading from the positive terminal 24 of the power supply, such as the battery over switch $S_{12}$ to a terminal 13a of the motor 13 so that the latter is energized only indirectly upon energization of energizing coil 25 of the lifting magnet 18. A line 220 leading to the control circuit of the clutch actuating mechanism in accordance with the present invention is connected in series with line 101 and in parallel with the motor energizing circuit branch 101'.

One control circuit each to be described more fully hereinafter is provided for the upward and downward shifting operations respectively, and the energizing coil 25 of the lifting magnet 18 is operatively interconnected in both of these control circuits, as will appear more fully from the ensuing description.

A switch $S_1$ is provided in the control circuit for the upward shifting operation and a switch $S_2$ in the control circuit for the downward shifting operation for purposes of manual actuation thereof. Self-locking or holding relays $R_3$ and $R_4$ provided with separate engaging or actuating switches $S_6$ and $S_5$, respectively, actuated by the guide disk member 10 provided with appropriate cams are operatively connected with or coordinated to the switches $S_1$ and $S_2$ in the holding circuits thereof.

The selection of the direction of rotation of the motor 13 corresponding to the desired shifting direction also has to take place by the control circuits. For that purpose, two relays $R_1$ and $R_2$ are operatively connected with or coordinated to the windings (not shown) or motor 13. Each relay $R_1$ and $R_2$ is provided with two energizing windings 20, 20' and 21, 21', respectively, and two switch members 30, 22 and 31, 23, respectively, of which one switch member each opens upon energization of the corresponding relay whereas the other one closes upon energization thereof. The coil 20 of the relay $R_1$ is arranged in the control circuit for the upward shifting operation and the coil 21 of the relay $R_2$ in the control circuit for the downward shifting operation. The other coils 20' and 21' are arranged as holding windings in series with the corresponding switches 30 and 31 operative to close upon energization so that the respective relay is automatically kept energized as soon as the motor 13 is supplied with current flowing through the corresponding winding. The switches 22 and 23 which open upon energization are operatively connected as lock-out switches in the control circuit for the other shifting direction respectively.

As pointed out hereinabove, the various speeds are engaged in the change-speed gear by means of the guide disk member 10, as will appear more fully hereinafter from the description of the operation of the shifting arrangement in accordance with the present invention, which guide disk member 10 is provided with guide slots 12 guiding therein the shifting forks 11. As also pointed out hereinabove, the guide disk member 10 is adapted to be rotated together with shaft 4 in both directions of rotation, for example, rotating in the clockwise direction for the up-shifting operation and in the counterclockwise direction thereof for the down-shifting operation. The shaft 4 is thereby effectively driven from an electric motor 13 over a worm gear drive 15 and the slip-clutch 14 which provides a predetermined amount of initial slippage each time the motor 13 is set into rotation upon energization thereof.

A second shaft 208 operatively connected at one end to worm gear drive 15 is also driven through the worm gear drive 15 in by-passing relationship with respect to slip-clutch 14. A lever 209 is secured to the other end of shaft 208. The push-rod 210 is pivotally secured at the free end of the eccentric lever 209, the free end of the push-rod 210 being slidingly guided within the guide member 211. The guide member 211 is pivotally secured to the clutch disengaging lever 212 which is operative to disengage, in a conventional manner, the vehicle clutch in the direction of movement thereof indicated by the arrow 215 by means of the fork member 214 arranged on the shaft 213. The vacuum mechanism 217 of any suitable known construction acts effectively on the clutch disengaging lever 212 by means of rod 216. The vacuum mechanism 217 provided with a check valve of suitable construction to enable escape of the air present therewithin is operatively connected thereby with the electromagnetically controlled venting valve 218. Control of the venting valve 218 takes place by means of switch 219 arranged in line 220 whereby the contact member 221 of switch 219 is actuated by the pin member 222 arranged at the eccentric lever 209.

*Manual Operation*

The manual operation of the gear shifting and clutch actuating mechanism in accordance with the present invention is as follows:

In the position of the various parts illustrated in FIGURE 1, the change-speed transmission is in the neutral position thereof and the vehicle clutch is in the engaged position thereof. If now, for example, for purposes of shifting in the upward direction into first speed, the pushbutton switch $S_1$ is actuated, then a control circuit is closed from the positive terminal 24 of the battery over energizing coil 25 of the lifting magnet 18, lines 26 and 27, the closed disengaging switch $S_6$, the holding relay $R_3$, line 28, the switch $S_1$ which is now closed, line 29, closed lock-out contact 23 at relay $R_2$ and the energizing winding 20 of relay $R_1$ to ground with which the negative terminal of the battery (not shown) is connected. As a result thereof, lifting magnet 18 and relay $R_1$ now are both energized and thereby attract the respective armature members thereof whereby the energizing circuit for the motor 13 is closed over switches $S_{12}$, line 101, branch line 101', motor terminals 13a and 13b, line 102 and contact 30 now closed to provide a direction of rotation of motor 13 corresponding to the upward shifting operation of the system. At the same time, the lifting magnet 18 thereby lifts the latch member 17 and the motor 13 drives the worm gear drive 15, rotates shaft 208 and seeks to rotate shaft 4 and therewith guide disk 10 over slip-clutch 14 in a clockwise direction into the position thereof corresponding to the next speed.

However, upon energizing of the electric motor 13 in the manner described hereinabove, the electric motor 13 at first actually rotates only the shaft 208 in the direction of arrow 232 over worm gear drive 15 while the slip-clutch 14 provides slippage so that the guide disk member 10 remains stationary whereby, upon rotation of shaft 208, at first the clutch actuating lever 212, which is operative to disengage the vehicle clutch by means of fork 214, is pushed in the direction of arrow 215 by means of eccentric lever 209, push-rod 210 and guide means 211. During this movement of the eccentric lever 209, of the push-rod 210, of the guide means 211 and of the clutch actuating or disengaging lever 212, the clutch disengaging lever 212 also displaces by means of rod 216 the air present in the vacuum device 217 into the atmosphere through a check valve (not shown) of any suitable construction. As soon as the vacuum mechanism 217 which may be of piston-type or diaphragm-type construction is practically without air, the latter retains by means of rod 216 the clutch disengaging lever 212 in the position thereof in which the vehicle clutch is disengaged. Since in the course of this movement, i.e., during rotation of the shaft 208, the pin member 222 arranged at the eccentric lever 209 has been moved out of engagement with contact member 221 of switch 219, the switch 219 is closed and therewith a second energizing circuit in parallel with the circuit from the positive battery terminal 24 over switch $S_{12}$, line 101 and line 220 for energizing the venting valve 218 of any suitable construction is closed. However, it should be noted that the venting valve had been closed previously by closure of switch $S_{12}$ as soon as the winding of the electromagnet 25 was energized over the circuit leading from the positive terminal of the battery 24 over switch $S_{12}$, line 101 and line 220 to the venting valve 218. In other words, the venting valve is energized as soon as the motor 13 is energized by closure of switch $S_{12}$, so that, in effect, switch $S_{12}$ constitutes the switch determining initial energization of the venting valve while the switch 219 only determines the release of the venting valve 218. As soon as the shaft 208 has passed through a predetermined angular path from the position thereof shown in the drawing in the direction of arrow 232, which is sufficiently large in order to disengage the vehicle clutch, the slip-clutch 14 now takes along over shaft 4 the guide disk member 10 in the clockwise direction thereof into the position corresponding to the next speed position thereof since, as pointed out hereinabove, the energizing coil 25 has attracted the armature of the lifting magnet 18 thereby lifting the latch member 17 to enable the clockwise rotation of the guide disk member 10.

During actuation of the push-button $S_1$, the holding relay $R_3$ has also been energized as a result of the closure of the series circuit described hereinabove. Consequently, control current is also permitted to flow through the circuit from the disengaging switch $S_6$ over relay $R_3$ directly to line 29 thereby effectively forming a circuit in parallel with the push-button $S_1$ so that the switch $S_1$ may again be released without interrupting the continued flow of control current in the control circuit described hereinabove. This means in effect that the switch $S_1$ has to be actuated only for a short period of time in order to initiate the upward shifting operation and thereby shift the transmission to the next higher speed.

De-energization of the control circuit described hereinabove takes place only when the disengaging switch $S_6$ is opened by one of the cams 32 provided on the guide disk member 10 whereby opening of the switch $S_6$ causes de-energization of the relay $R_3$. As a result thereof, the energizing coil 25 of lifting magnet 18 is also de-energized. However, the armature thereof is able to return to the initial position thereof only when the next notch or detent 16 of the guide disk member 10 is positioned accurately below the latch member 17 whereupon the latter may return into the lowered position thereof as illustrated in FIGURE 1. Return of the latch member 17 to the lower position thereof causes opening of switch $S_{12}$. However, the motor at first continues to run since energization thereof is maintained over the parallel circuit including switch 219 and line 220 connected with line 101, as long as switch 219 remains closed. This means, in effect, that the motor 13 continues to run by being energized over the parallel energization circuit including switch 219 to re-engage eventually the clutch. Motor 13 continues to run until the pin member 222 re-opens the switch 219 by abutment thereof with the contact 221. At that point, the motor 13 is again disconnected from the two parallel power supply circuits including lines 101' and 101 and switch $S_{12}$ and including lines 101' and 220 and switch 219, and comes shortly thereafter to a stop, at least as soon as switch 219 is opened. Thus, switch $S_{12}$, in effect, merely controls the initial energization of the motor 13 and of the venting valve 218, while switch 219, in effect, determines the de-energization thereof. However, the cam portions 32 on the disk member 10 are so located that the disengaging switch $S_6$ has already moved off the corresponding cam member 32 again when the notch 16 is accurately positioned underneath the latch member 17 to permit the latter to assume its lower position and is thereby again placed into readiness for the next upward shifting operation.

Since the shaft 208 is also taken along with the shaft 4 during energization of motor 13 while guide disk member 10 is rotated, the eccentric lever 209 moves also back to the initial position thereof illustrated in the drawing without, however, taking along for the time being the clutch disengaging lever 214 since the push-rod 210 is free to slide within guide means 211 in a direction away from the lever 212. As soon as the initial position of the eccentric lever 209 is attained, the pin member 222 of the eccentric lever 209 abuts against the contact member 221 of the switch 219 and thereby re-opens switch 219. As a result thereof, the motor 13 is de-energized if switch $S_{12}$ has already opened as described hereinabove, and the circuit for valve 218 is opened and therewith the venting valve 218 is de-energized and thereupon opens, for example, under the effect of a spring (not shown) so that the vacuum device 217 is vented, i.e., is placed into communication with the atmosphere so that air is admitted into the vacuum control device 217 thereby releasing rod 216 whereby the springs of the main clutch (not shown) have an opportunity to re-engage the vehicle clutch as is conventional when the pressure is normally taken off a clutch disengaging lever. The clutch disengaging lever 212 thereby moves in a direction opposite to the direction of arrow 215 and the guide means 211 slides upon the push-rod 210 in the direction toward the shaft 208.

The upward shifting operation into second speed takes place in an analogous manner. If the switch $S_1$ is pushed in for a longer period of time, then a shifting operation through several speeds, or example, from first into third speed may be achieved. The upward shifting operation thereby can take place only up to the highest speed of the change-speed transmission, in the instant case up to the fourth speed thereof. In this fourth speed position, the relatively wider cam portion 34 provided at the guide disk member 10 keeps the disengaging switch $S_6$ in the open position thereof so that the lifting magnet 18 can no longer be actuated over the control circuit of the upward shifting operation as described hereinabove, even if the pushbutton $S_1$ is depressed.

It should also be noted that the switch $S_{12}$ is actuated by the switching member 19 during each actuating of the lifting magnet 18 and thereby not only energizes the motor 13 but also closes the circuit for the automatic controlled circuit over line 220 since switch $S_{12}$ and switch 219 are effectively connected in parallel.

The manual downward shifting operation takes place in a corresponding manner over switch or push-button $S_2$, however, only from the second to fourth speed thereof as only in these speeds the normally opened disengaging switch $S_5$ is closed by one of the cam portions 32.

If the push-button $S_2$ is actuated in any one of the second to fourth speeds, then current flows from the positive terminal 24 over the energizing coil 25 of the lifting magnet 18, the line 35, the disengaging switch $S_5$ which is now closed to the holding relay $R_4$ and from holding relay $R_4$ over line 36 to the switch $S_2$ which has now been closed. The control current flows from switch $S_2$ over line 37, contact 22 to the energizing winding 21 of the motor relay $R_2$ and then to ground. The motor relay $R_2$ as well as lifting magnet 18 thereby attract the respective armatures thereof and motor 13 thereby drives the worm drive 15, and therewith rotates shaft 208 and subsequently also guide disk 10 in the counterclockwise direction into a position for the next lower speed. The disengagement of the energizing circuits for motor 13 as well as the readying of the control circuits for the next shifting operation takes place in an analogous manner as in the upward shifting operation by cams 32 cooperating with the disengaging with $S_5$. Furthermore, the automatic clutch disengagement and re-engagement also takes place in an anaogous manner as in the upward shifting operation by initially rotating shaft 208 while the slip-clutch 14 slips so that shaft 4 and therewith guide disk member 10 remain stationary so as to rotate initially only eccentric lever 209 and therewith actuate the parts 210, 211, 212, 214, 216, 217 and 218 in the manner described hereinabove in connection with the upward shifting.

Automatic Shifting Operation

The automatic shifting operation of the gear shift and clutch actuating mechanism in accordance with the present invention as illustrated in the single figure of the drawing is as follows:

An automatic shifting operation controlled by the centrifugal governor 38 is coordinated to the manual shifting arrangement in accordance with the present invention described hereinabove. The centrifugal governor 38 is operatively connected with the transmission input shaft and is provided with three shifting contacts $K_1$, $K_2$ and $K_3$. The shifting contact $K_1$ is arranged in a control circuit for the automatic upward shifting operation and is disposed in parallel with the switch $S_1$. The centrifugal governor 38 thereby closes the contact $K_1$ above a predetermined rotational speed of, for example, 5500 r.p.m. In that case, the control current flows in a manner described hereinabove from positive terminal 24 through the energizing coil 25 of the lifting magnet 18 lines 26 and 27 into the line 28 and from there over line 39, the normally closed switch $S_{10}$ and contact $K_1$ at the centrifugal governor 38 which has now been automatically closed into line 40 which is operatively connected with the line 29. As a result thereof, the automatic control circuit for the upward shifting operation is closed and lifting magnet 18 is energized and thereby causes the upward shifting operation in the manner described hereinabove. During energization of the shifting magnet 18, the normally closed switch $S_{10}$ in the automatic control circuit is opened so that the disengagement after completion of the change in the engaged speed takes place in the manner already described hereinabove by relay $R_3$ in connection with the disengaging switch $S_6$.

An automatic control circuit for the downward shifting operation is closed, for example, at a rotational speed below 1500 r.p.m., by the contact $K_2$ also arranged at the centrifugal governor 38. This last-mentioned control circuit is arranged in a circuit including line 41 connected to line 36, normally closed switch $S_9$, shifting switch $K_2$ and line 42 connected to line 37, which is in parallel with the downward shifting switch $S_2$ and is operative in a similar manner. If, for example, in fourth speed, the rotational speed of the transmission input shaft falls below 1500 r.p.m. by reason of an incline, then the contact $K_2$ closes and control current is now permitted to flow through the energizing coil 25 of the lifting magnet 18, line 35, disengaging switch $S_5$, holding relay $R_4$ into the line 36. From line 36, the control circuit flows over line 41 and switch $S_9$, shifting switch or contact $K_2$ now closed and line 42 into the line 37. As a result thereof, the control circuit for the downward shifting operation is closed so that the downward shifting operation can take place in the manner described hereinabove. Upon energization of the lifting magnet 18, the switch $S_9$ is opened by the shifting member 19 thereof and the automatic control circuit for the downward shifting operation is again interrupted so that after completing the change into the next speed, the disengagement of the downward shifting operation may take place again over switch $S_5$ and relay $R_4$ as described hereinabove.

A further shifting switch or contact $K_3$ which is interconnected into line 37 is also operatively connected with the centrifugal governor 38. The contact $K_3$ is normally closed and disconnects or opens up all control circuits for the downward shifting operation as soon as the centrifugal governor 38 attains a rotational speed which lies below the maximum engine speed by a factor corresponding to the change in adjacent transmission ratios. In the case, i.e., as contact $K_3$ opens, no downward shifting operation is any longer possible. This serves the purpose to prevent an excessive rotational speed of the engine over and above its maximum engine speed by a downward shifting operation into a speed of the change-speed transmission which is too low.

In order to achieve certain shifting positions, separate switches are provided which are adapted to be actuated exclusively manually. For example, for purposes of engaging neutral position of the change-speed transmission, a special switch $S_3$ is provided. The switch $S_3$ which is provided with two contacts $S_3'$ and $S_3''$ is connected in a circuit which includes the line 26 and a line 43 connecting line 26 with both contacts $S_3'$ and $S_3''$. The switch $S_3$ is operative in connection with both control circuits whereby a respective control is locked depending on the shifting position. Lines 44 and 45 lead from contacts $S_3'$ and $S_3''$ respectively to the locking switches $S_7$ and $S_8$ which abut against the circumference of the guide disk 10 and to which a separate cam portion 46 is coordinated. In the neutral position of the shifting arrangement illustrated in FIGURE 1, both normally closed locking switches $S_7$ and $S_8$ are opened. If one of the forward speeds is engaged, then switch $S_7$ moves off cam portion 46 and is thereby closed by reason of a corresponding position of the cam portion 46 which in the neutral position had kept the switch $S_7$ open so that with an actuation of the neutral switch $S_3$ only the control and energizing circuit for the downward shifting operation over lines 26 and 43, contact $S_3'$, line 44, switch $S_7$ and lines 47 and 48 is closed and the transmission is shifted downwardly into neutral. If, in contradistinction thereto, the transmission is engaged in the reverse speed thereof, then the switch $S_8$ moves off cam portion 46 and is thereby closed, whereas the switch $S_7$ remains open. In that case, only the energizing control circuit for the upward shifting operation can be closed over lines 26 and 43, contacts $S_3''$, line 45, switch $S_8$ and the line 49 connected with line 29 so that only an upward shifting operation into neutral position can take place within the transmission.

For purposes of engaging the reverse speed, a separate switch $S_4$ is provided. The switch $S_4$ is also operatively connected with the line 26 over line 103. However, since in that case the downward shifting operation into reverse speed has to take place at all times, a cooperation with the switches $S_7$ and $S_8$ is not necessary. Consequently, switch $S_4$ is operatively connected directly over lines 103, 50 and 43 with the line 37 for the downward shifting operation.

Holding relays may be coordinated to the switches $S_3$ and $S_4$ in a manner similar to switches $S_1$ and $S_2$ and relays $R_3$ and $R_4$ so that with either of these two last-mentioned switches $S_3$ or $S_4$ only a relatively short depression of the respective switches is necessary in order to shift the transmission from a prevailing speed into the desired speed.

While I have shown and described one embodiment in accordance with the present invention, it is understood that the same is not limited thereto but is susceptible of many changes and modifications within the spirit and scope of the present invention. For example, the automatic clutch actuation mechanism illustrated in the drawing of the present application may also be used to equal advantage with the gear shifting arrangement illustrated in FIGURE 2 of the said co-pending application. Additionally, the automatic clutch actuating mechanism and in particular the automatic clutch disengagement thereof may be used also with any other gear shift mechanism producing the necessary control features to operate such automatic clutch disengaging mechanism.

Thus it is obvious that the present inventon is not limited to the particular details shown and described herein but is susceptible of many changes and modifications within the spirit and scope of the present invention. Consequently, I do not wish to be limited to the details shown and described herein but intend to cover all such changes and modifications as are encompassed by the scope of the appended claims.

I claim:

1. An electric shifting and clutch actuating mechanism for a change-speed transmission driven by a clutch coordinated thereto, especially for motor vehicles, comprising shifting means for said transmission, rotatable guide means within said transmission for guiding said shifting means, clutch disengaging means, electric drive means including an electric motor operatively connected with speed reduction gear means and slip-clutch means for driving said guide means from said electric motor in either direction of rotation thereof, control means for producing electric shifting pulses, said guide means being provided along the periphery thereof with a number of notches corresponding to the individual shifting positions, latch means adapted to engage in a notch when properly positioned therebelow, electromagnetic means included in said control means for selectively actuating said latch means in the engagement and disengagement thereof in dependence on said shifting pulses, and means operatively connecting said clutch disengaging means with said electric drive means in by-passing relationship with respect to said slip-clutch means for initially disengaging said clutch disengaging means in response to one of said shifting pulses and for retaining said clutch disengaging means in the position thereof corresponding to the disengaged position of the clutch until the next speed is engaged by rotation of said guide means.

2. An electric shifting and clutch actuating mechanism according to claim 1, wherein said control means includes means for selectively producing said shifting pulses, and for automatically producing said pulses in dependence on the rotational speed of the driving engine of the vehicle.

3. An electric shifting and clutch actuating mechanism according to claim 1, wherein said disengaging means includes a clutch disengaging lever, converting means operatively connected with said electric drive means for converting the rotary movement of the latter into reciprocating movements, and rod means operatively connecting said converting means with said disengaging lever for positively moving said disengaging lever into the disengaging position thereof, and auxiliary control means operatively connected with said disengaging lever for retaining the same in the disengaging position thereof until the next speed is engaged.

4. An electric shifting and clutch actuating mechanism according to claim 3, wherein said rod means includes a push-rod operatively connected at one end thereof with said converting means, guide means operatively connected at one end thereof with said disengaging lever and guiding at the other end thereof the other end of said push-rod in such a manner as to assure positive actuation of said disengaging lever upon movement of said converting means and therewith of said push-rod in the direction corresponding to the disengaging direction of said disengaging lever while enabling relative movement between said push-rod and said guide means in the opposite direction, and wherein said auxiliary control means includes retaining means for retaining said disengaging lever in the disengaging position thereof until the next speed is engaged.

5. An electric shifting and clutch actuating mechanism according to claim 4, wherein said retaining means is a vacuum-operated device including valve means, and electric control means operatively connected with said first-mentioned control means for closing said valve until the next speed is engaged thereby to retain said disengaging lever in the disengaged position thereof.

6. An electric shifting and clutch actuating mechanism according to claim 5, further comprising an electric control circuit for said valve including switch means operated by said converting means.

7. An electric shifting and clutch actuating mechanism according to claim 1, wherein said control means includes control circuits for each direction of shifting operation and energizing circuits for said electric drive means to cause rotation of said electric drive means in a direction corresponding to the respective shifting direction, and means including relay means in each of said energizing circuits and operatively interconnecting said circuits with each other for controlling a respective relay means directly by the corresponding control circuit.

8. An electric shifting and clutch actuating mechanism according to claim 7, wherein each relay means is provided with two energizing windings and two contacts, one contact each opening upon energization and the other closing upon energization of a respective winding.

9. An electric shifting and clutch actuating mechanism according to claim 8, further comprising holding circuit means including one of said energizing windings and one of said contacts while each of the other energizing windings for the same shifting direction and the other contact thereof are operatively connected in the control circuit of the other shifting direction and forming lock-out switch means.

10. An electric shifting and clutch actuating mechanism according to claim 1, wherein said electric drive means includes energizing circuit means, wherein said control means includes control circuits operatively connected with relay means, and wherein said electromagnetic means includes an energizing winding arranged in parallel to the energizing circuit means for said electric drive means and is operative to be controlled by said relay means for both shifting directions, switch means operatively connected with said electromagnetic means, and means including said relay means for indirectly controlling said energizing circuit means for said electric drive means over said switch means by said relay means.

11. An electric shifting and clutch actuating mechanism according to claim 10, wherein said relay means include one relay each for each shifting direction operatively connected with a corresponding energizing circuit means of said electric drive means, and a further relay operatively connected in parallel with each of said first-mentioned relays, said further relays being also controlled by said switch means operatively connected with said electromagnetic means, each of said further relays including contact means operatively connected with said control means to serve as holding relay for the respective energizing circuit means of said electric drive means and as lock-out switch for the other shifting direction.

12. An electric shifting and clutch actuating mechanism according to claim 1, wherein said control means includes manually operated actuating means for initiating a shifting operation in either shifting direction, holding relay means operatively connected in parallel with a respective manual actuating means including a holding circuit, and automatically actuated disengaging means in said holding circuit adapted to be operated by said guide disc means.

13. An electric shifting and clutch actuating mechanism according to claim 1, wherein said control means includes a control circuit for an upward shifting operation and a control circuit for a downward shifting operation of said transmission, energizing circuits for said electric drive means to produce rotation in either direction, one of said energizing circuits corresponding to the control circuit for the upward shifting operation and another energizing circuit corresponding to the control circuit for the downward shifting operation, said electromagnetic means including an energizing winding and an energizing circuit for said winding, and means connecting the energizing circuit for said winding in the control circuits for both shifting directions and for operatively connecting the energizing circuits with said control circuits to control said electromagnetic means directly by said shifting pulses and for controlling said energizing circuits indirectly by said shifting pulses.

14. An electric shifting and clutch actuating mechanism according to claim 13, wherein said last-mentioned connecting means includes switch means indirectly controlling the energizing circuits by said shifting pulses, and further switch means operatively connected with said electromagnetic means for actuating said first-mentioned switch means.

15. An electric shifting and clutch actuating mechanism for a change-speed transmission driven by a clutch coordinated thereto, especially for motor vehicles, comprising transmission shifting means, rotatable guide disc means within said transmission for guiding said shifting means, clutch disengaging means including a clutch disengaging lever, electric drive means including an electric motor drivingly connected with speed reduction gear means and slip-clutch means for driving said guide disc means from said electric motor in either direction of rotation thereof, circuit means for producing electric shifting pulses including control circuit means for each shifting direction, said guide disc means being provided along the periphery thereof with a number of notches corresponding to the individual shifting positions, electromagnetically engageble means adapted to engage in a notch when properly positioned therebelow, motor energizing circuit means for energizing said motor to rotate in either direction of rotation thereof, means operatively interconnecting said motor energizing circuit means, said control circuit means and said electromagnetically engageable means to shift said transmission in one or the other direction upon energization of said motor energizing means and said electromagnetically engageable means, means operatively connecting said clutch disengaging lever with said electric motor in by-passing relationship with respect to said slip-clutch means for initially moving said disengaging lever into the clutch disengaging position thereof and for only thereafter rotating said guide disc means to engage the next speed, and auxiliary control means operated by said last-mentioned connecting means for retaining said disengaging lever in said clutch disengaging position until said next speed is engaged.

16. An electric shifting and clutch actuating mechanism according to claim 15, wherein said circuit means for producing electric shifting pulses includes centrifugal governor means operatively connected with the transmission input shaft including a plurality of contact means, and means operatively connecting a respective one of said contact means in a corresponding control circuit means to automatically shift the transmission in the upward or downward direction in dependence on the speed of said transmission input shaft.

17. An electric shifting and clutch actuating mechanism according to claim 16, wherein said circuit means for producing electric shifting pulses includes manually actuatable switch means arranged in parallel with said contact means.

18. An electric shifting and clutch actuating mechanism according to claim 17, wherein one of the contact means of said centrifugal governor means is operative to open up both the manually-operated and automatically-operated control circuit means for the downward shifting operation of said transmission as soon as said centrifugal governor means attains a rotational speed which is below the maximum permissive engine speed by a factor corresponding to the step in adjacent transmission ratios.

19. An electric shifting and clutch actuating mechanism according to claim 16, wherein each automatically-controlled circuit means controlled by said contact means includes lock-out switch means opening upon energization of said electromagnetically engageable means.

20. An electric shifting and clutch actuating mechanism according to claim 16, wherein said electromagnetically engageable means includes a two-pole switch operatively connected therewith, and wherein all of the automatically-controlled circuit means are operatively connected with said two-pole switch.

21. An electric shifting and clutch actuating mechanism according to claim 15, further comprising manually-actuated switch means for the neutral position of the transmission including contact means for each shifting direction, and circuit means interconnecting said contact means with said control circuit means and including selectively engageable means automatically actuated by said guide disc means in dependence on the shifting position and shifting direction thereof.

22. An electric shifting and clutch actuating mechanism according to claim 21, further comprising a manually-actuatable reverse switch to engage the reverse speed of the transmission, means including holding relay means operatively connected with said last-mentioned switch to enable engagement of the reverse speed only by actuation of said last-mentioned switch, and cam means at said disc means for rendering said reverse switch selectively effective and ineffective.

23. An electric shifting and clutch actuating mechanism for a change-speed transmission driven by a clutch coordinated thereto, comprising shifting means for said transimssion, rotatable guide means within said transmission for guiding said shifting means, clutch disengaging means, electric drive means, control means operatively connected with said electric drive means for producing electric shifting pulses effectively controlling energization of said drive means, and means operatively connecting said electric drive means with said rotatable guide means and with said clutch disengaging means for initially actuating said clutch disengaging means after producing one of said shifting pulses and for retaining said clutch disengaging means in the position thereof corresponding to the disengaged position of the clutch until the next speed is engaged by subsequent rotation of said guide means, said control means including means for automatically producing said shifting pulses in dependence on the rotational speed of the engine.

24. An electric shifting and clutch actuating mechanism for a change-speed transmission driven by a clutch coordinated thereto, comprising shifting means for said transmission, rotatable guide means within said transmission for guiding said shifting means, clutch disengaging means, electric drive means, control means operatively connected with said electric drive means for producing electric shifting pulses effectively controlling energization of said drive means, and means operatively connecting said electric drive means with said rotatable guide means and with said clutch disengaging means for initially actuating said clutch disengaging means after producing one of said shifting pulses and for retaining said clutch disengaging means in the position thereof corresponding to the disengaged position of the clutch until the next speed is engaged by subsequent rotation of said guide means, said last-mentioned connecting means including means initially providing a predetermined amount of slippage between said drive means and said guide means while said clutch disengaging means is being driven by said drive means upon producing said shifting pulse.

References Cited in the file of this patent

UNITED STATES PATENTS

| | | |
|---|---|---|
| 905,637 | Beskow | Dec. 1, 1908 |
| 1,074,599 | Bradley | Oct. 7, 1913 |
| 1,693,645 | Fahrney | Dec. 4, 1928 |
| 2,092,446 | Fleischel | Sept. 7, 1937 |
| 2,140,641 | Hewitt | Dec. 20, 1938 |
| 2,427,652 | Banker | Sept. 23, 1947 |
| 2,529,379 | Dumont | Nov. 7, 1950 |